United States Patent [19]

Miguet et al.

[11] 4,452,319

[45] Jun. 5, 1984

[54] DISK HARROW WITH INDIVIDUALLY SPRING-MOUNTED DISKS

[76] Inventors: Paul S. Miguet; Simon H. Miguet, both of La Pierre (Isere), France

[21] Appl. No.: 296,896

[22] Filed: Aug. 27, 1981

[51] Int. Cl.³ .............................................. A01B 61/04
[52] U.S. Cl. ..................................... 172/573; 172/574; 172/711; 172/709
[58] Field of Search ............... 172/440, 441, 574, 573, 172/711, 264, 265, 266

[56] References Cited

U.S. PATENT DOCUMENTS

| | | | |
|---|---|---|---|
| 434,100 | 8/1890 | Thramer | 172/711 X |
| 1,225,853 | 5/1917 | Pidgeon | 172/271 |
| 2,352,963 | 7/1944 | McMahon | 172/441 X |
| 3,486,566 | 12/1969 | Nja | 172/265 |
| 3,627,061 | 12/1971 | Sample | 172/711 |
| 3,967,685 | 7/1976 | Siekmeir | 172/573 |
| 4,128,130 | 12/1978 | Green | 172/266 |

FOREIGN PATENT DOCUMENTS

| | | | |
|---|---|---|---|
| 21109 | 7/1929 | Australia | 172/573 |
| 2624004 | 8/1977 | Fed. Rep. of Germany | 132/711 |
| 7523511 | 11/1977 | Fed. Rep. of Germany | 172/573 |
| 2725122 | 12/1978 | Fed. Rep. of Germany | 172/271 |
| 1024964 | 11/1950 | France | 172/271 |
| 1079859 | 3/1953 | France | 172/711 |
| 64566 | 6/1955 | France | 172/711 |
| 2000093 | 1/1969 | France | 172/271 |
| 2389313 | 5/1977 | France | 172/573 |
| 2389314 | 5/1977 | France | 172/271 |

OTHER PUBLICATIONS

Kverneland Moldboard plows, Advertizing Brochure of Kverneland Norway, 9/1979.

*Primary Examiner*—Richard J. Johnson
*Attorney, Agent, or Firm*—Karl F. Ross; Herbert Dubno

[57] ABSTRACT

A disk harrow has a frame adapted to be pulled along the ground in a normal travel direction and having at least one frame member, a mount on this frame adapted to secure same to a three-point tractor hitch, and a plurality of disk assemblies. Each of these disk assemblies in turn includes an inner pivot part fixed on the frame and forming lower, middle, and upper horizontal axes transverse to said direction, an outer pivot part spaced in the normal travel direction from the inner part and having respective lower, middle, and upper horizontal axes transverse to the travel direction. Respective rigid lower and middle links are pivoted on the parts between the respective lower and middle axes with the middle link shorter than the lower link. An upper leaf spring is pivoted on the parts between the upper axes, and a harrow disk is rotatable about a harrow axis transverse to the travel direction on the outer pivot part below the respective axes.

8 Claims, 3 Drawing Figures

DISK HARROW WITH INDIVIDUALLY SPRING-MOUNTED DISKS

FIELD OF THE INVENTION

The present invention relates to a disk harrow. More particularly this invention concerns such a harrow which is tractor-mounted—wholly carried by a tractor three-point hitch—as compared to the trailer type—supported by wheels on the ground and pulled by the tractor.

BACKGROUND OF THE INVENTION

A disk harrow, that is a harrow whose operative tools are disks rather than tines or forks, is often preferred when stumps, roots, or other underground obstructions are likely to be encountered. The disks of such a device must be urged with considerable force down against the ground, but at the same time must be able to move upwardly and out of the way without being damaged should they hit an obstruction. Obviously these functions are somewhat mutually contradictory, so one must normally trade off ability to move out of the way against downwardly effective biasing force.

The best of such agricultural apparatuses normally has several problems. Frequently when one disk is deflected by an obstruction the other disks also respond somewhat, lifting them out of the ground also. In addition these machines are often quite large and cumbersome, making it difficult to use them in orchards or other areas where tight maneuvering might be necessary.

OBJECTS OF THE INVENTION

It is therefore an object of the present invention to provide an improved disk harrow.

Another object is the provision of such a disk harrow which overcomes the above-given disadvantages.

SUMMARY OF THE INVENTION

These objects are attained according to the instant invention in a disk harrow comprising a frame adapted to be pulled along the ground in a normal travel direction and having at least one frame member, a mount on this frame adapted to secure same to a three-point tractor hitch, and a plurality of disk assemblies. Each of these disk assemblies in turn includes an inner pivot part fixed on the frame and forming lower, middle, and upper horizontal axes transverse to said direction, an outer pivot part spaced in the normal travel direction from the inner part and having respective lower, middle, and upper horizontal axes transverse to the travel direction, respective rigid lower and middle links pivoted on the parts between the respective lower and middle axes with the middle link shorter than the lower link, an upper leaf spring pivoted on the parts between the upper axes, and a harrow disk rotatable about a harrow axis transverse to the travel direction on the outer pivot part below the respective axes.

Thus each of the disks of the harrow according to the instant invention is completely independent of the other disks, that is it can move vertically without urging the other disks vertically. The use of a parallelogrammatic linkage with a short upper arm also insures, when the arms extend back in the direction from the frame member, that the disk will swing back and out of the way as it moves up, making it in effect evade an obstruction. A leaf spring mounted in the parallelogrammatic linkage urges the respective disk down with a force that does not change much over the vertical stroke of the respective disk, unlike a system incorporating a vertical coil spring that is increasingly stiff as it is compressed.

According to another feature of this invention the frame has two such frame members spaced horizontally in the travel direction and each carrying a plurality of such assemblies. The disk axes of one of the members are inclined to one side of the travel direction and the disk axes of the other of the members are inclined to the direction to the other side. Thus the net lateral forces on the disk harrow will be zero, so that there will be no tendency of the harrow to move laterally to one side or the other.

In accordance with another feature of this invention each of the disk assemblies is provided with means defining for the respective inner pivot part a respective vertical pivot axis for pivoting of the respective assembly through a limited arc about the respective vertical axis on the member. Each such vertical pivot means is provided with spring means engaged at the respective vertical axis between the respective inner part and the member for uring the respective links and spring into a predetermined angular position with respect to the direction. In this position the links extend at an angle to the normal travel direction. The disk axes are transverse to the respective links. In fact the disk axes and links are oppositely inclined to the travel direction.

DESCRIPTION OF THE DRAWING

The above and other features and advantages will become more readily apparent from the following, reference being made to the accompanying drawing in which.

SPECIFIC DESCRIPTION

Figure 1:
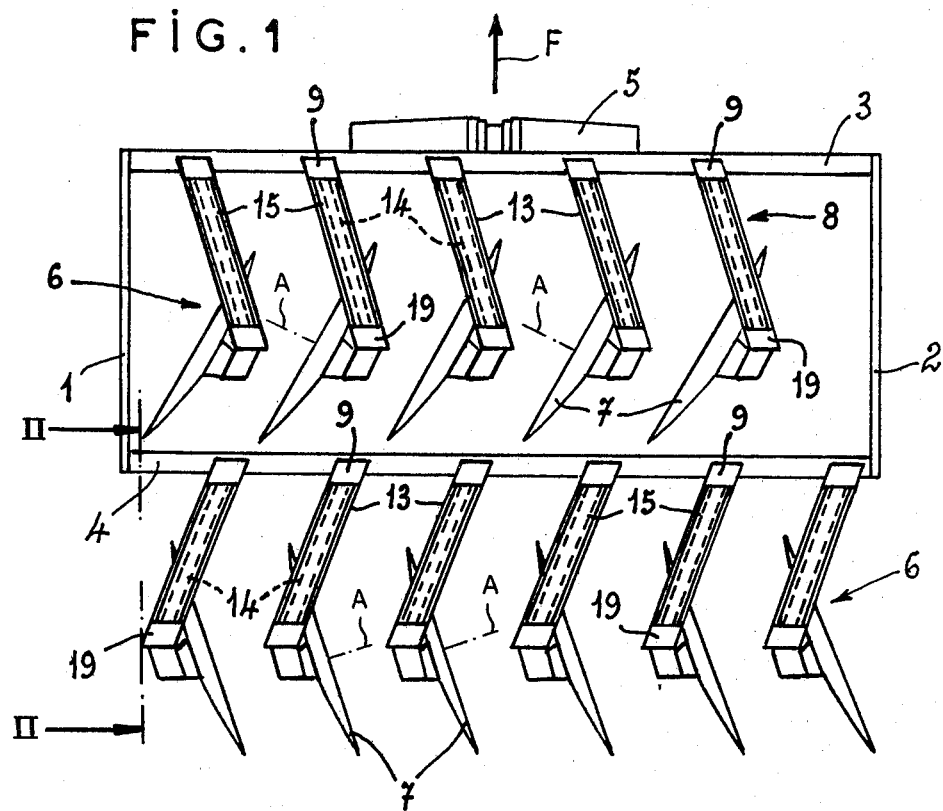
FIG. 1 is a top view of a disk harrow according to the instant invention.

As seen in FIG. 1 a disk harrow has a frame formed by two short longitudinal members 1 and 2 and two long transverse members 3 and 4. The front transverse member 3, relative to a normal direction F of travel of the harrow carries a mount 5 for connection of the frame 1-4 to a three-point trailer hitch. The frame 1-4 carries on its front member 3 five disk assemblies 6 having disks 7 rotatable about horizontal axes A inclined in one direction to the travel direction F and the rear member 4 has five disk assemblies 6 whose disks 7 are rotatable about horizontal axes A inclined in the opposite direction to the travel direction F.

Figure 2:
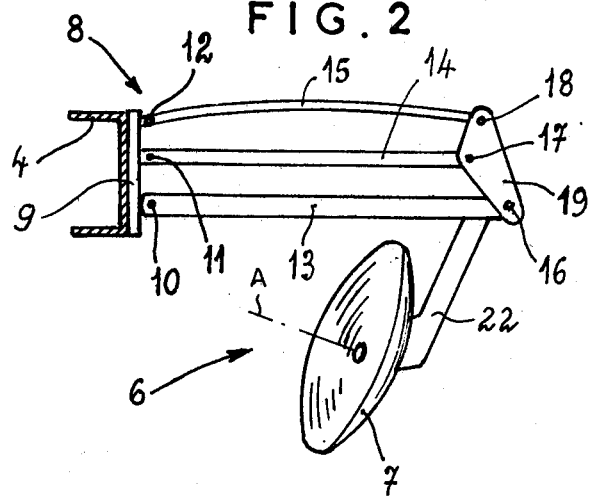
FIG. 2 is a large-scale section taken along line II—II of FIG. 1.

As seen in FIG. 2 each of the assemblies 6 includes a parallelogrammatic linkage 8 having an inner part 9 fixed to the respective member 3 or 4 and defining lower, middle, and upper horizontal pivot axes 10, 11, and 12 all transverse to the direction F. The linkage 8 further has an outer member 19 further defining horizontal lower, middle, and upper horizontal pivot axes 16, 17, and 18 perpendicular to the direction F and has a downwardly extending rigid arm 22 carrying the respective disk 7. The disks 7 can be dished as shown, or may be flat and may have toothed edges.

Extending between the lower axes 10 and 16 is a rigid and relatively long lower link 13. A rigid and relatively short middle link 14 extends between the middle axes 11 and 17. A leaf spring 15 is pivoted between the upper axes 18. Since the middle link 14 is shorter than the lower link 13, as the outer part 19 is pushed up relative to the inner part 9, the outer part 19 will pivot out at the bottom about the axis 17. This action therefore swings the respective disk 7 back and away from any obstruction that it hits that forces it upwardly.

The leaf spring 15 pivoted at 12 and 18 on the parts 9 and 19 is unstressed when the outer part 19 is relatively low with respect to the inner part 9, so that this spring 25 normally presses the respective disk 7 down into the ground. Like any leaf spring, the spring 15 offers substantially even resistance to deformation whether it is deformed a little or quite a bit, so that the resistance of the respective disk to upward displacement is substantially the same at any point in its range of vertical travel.

Figure 3:
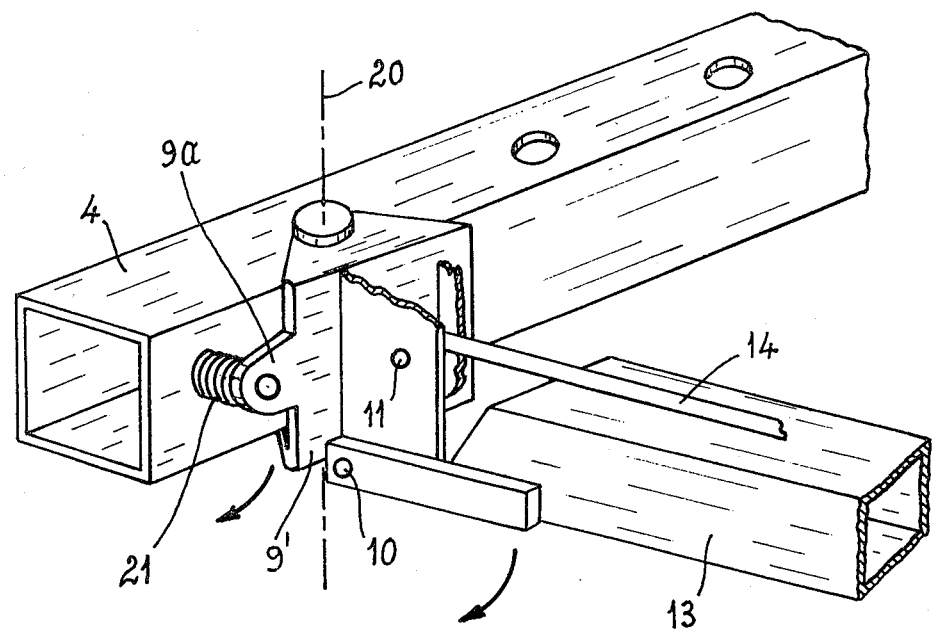
FIG. 3 is a large-scale perspective view of a detail of another arrangement according to the present invention.

It is also possible as shown in FIG. 3 to replace the inner part 9 with a part 9' pivotal on the member 4 about a vertical axis 20. This part 9' is formed with a tab 9a. A compression spring 21 is braced between this tab and the rear face of the member 4. The part 9' is therefore urged into one and position extending at an angle to the direction F, but can pivot into a position substantially parallel to this direction F.

In any case as shown in FIG. 1 the links 13 and 14 of the linkages 8 of the disk assemblies 6 of the front frame member all extend to one side of the direction F at an acute angle of about 20° to this direction. The linkages 8 of the assemblies 6 of the rear member 6 are all complementarily and oppositely inclined to the direction F. At the same time the disk axes A of the assemblies 6 of the front member 3 are all inclined at a slightly greater angle of about 25°, but in the opposite direction, to the direction F and the assemblies 6 of the rear member 4 are complementarily oppositely inclined. These inclinations of the various mounting parts and of the disks, combined with the short-arm/long-arm arrangement in the parallelogrammatic linkages 8 makes the system particularly usable in terrain where roots, stumps, or other underground obstructions are likely, as the disks 7 will not be damaged by these obstructions, but instead will swing out of the way to evade them. Since the entire assembly is hung from the hitch, having no ground-engaging wheels or the like, the disk harrow according to the instant invention is therefore ideal for use in cramped quarters, such as in orchard or on terraced farm acreage. In addition the balancing of forces within the harrow, from the complementarily oppositely inclined elements of the disk assemblies 6, completely balances forces within the frame 1-4. Thus this frame 1-4 can be of relatively light construction, making the system even more maneuverable.

We claim:

1. A disk harrow comprising:

a frame adapted to be pulled along the ground in a normal travel direction and having at least one frame member;

a mount on said frame adapted to secure same to a three-point tractor hitch; and a plurality of disk assemblies each including an inner pivot part fixed on said frame and forming lower, middle, and upper horizontal axes transverse to said direction, an outer pivot part spaced in said direction from said inner part and having respective lower, middle, and upper horizontal axes transverse to said direction and nondisplaceable relative to one another on said outer part, respective rigid lower and middle links pivoted on said parts between the respective lower and middle axes, said middle link being shorter than said lower link, whereby the outer pivot part pivots about its middle axis as it is moved up relative to the inner pivot part with simultaneous displacement of said upper axes toward each other, an upper leaf spring pivoted on said parts between said upper axes and of such a spring constant that it resists displacement of said upper axes toward each other with a generally constant force, a harrow disk rotatable about a harrow axis transverse to said direction below said outer pivot part and the respective axes; and means defining for the respective inner pivot part a respective vertical pivot axis for pivoting of the respective assembly through a limited arc about the respective vertical axis on said member.

2. The disk harrow defined in claim 1 wherein said frame has two such frame members spaced horizontally in said direction and each carrying a plurality of such assemblies.

3. The disk harrow defined in claim 2 wherein the disk axes of one of said members are inclined to said direction to one side and the disk axes of the other of said members are inclined to said direction to the other side.

4. The disk harrow defined in claim 1 wherein each of said assemblies is provided with spring means engaged at the respective vertical axis between the respective inner part and said member for urging the respective links and spring into a predetermined angular position with respect to said direction.

5. The disk harrow defined in claim 4 wherein said links extend at an angle to said direction in said position.

6. The disk harrow defined in claim 5 wherein said disk axes are transverse to the respective links.

7. The disk harrow defined in claim 6 wherein said disk axes and links are oppositely inclined to said direction.

8. The disk harrow defined in claim 1 wherein each of said outer parts trails the respective inner part relative to said direction.

* * * * *